(12) United States Patent
Seo

(10) Patent No.: US 7,360,466 B2
(45) Date of Patent: Apr. 22, 2008

(54) DOUBLE CLUTCH TRANSMISSION

(75) Inventor: Jin-Beom Seo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 91 days.

(21) Appl. No.: 11/200,782

(22) Filed: Aug. 9, 2005

(65) Prior Publication Data

US 2006/0032320 A1    Feb. 16, 2006

(30) Foreign Application Priority Data

Aug. 13, 2004    (KR) ...................... 10-2004-0063803

(51) Int. Cl.
*F16H 3/08*    (2006.01)
(52) U.S. Cl. .......................... 74/331; 74/340
(58) Field of Classification Search .................. 74/329, 74/330, 331, 340
See application file for complete search history.

(56) References Cited

U.S. PATENT DOCUMENTS

| | | | | |
|---|---|---|---|---|
| 4,461,188 A | * | 7/1984 | Fisher .......................... | 74/330 |
| 7,044,013 B2 | * | 5/2006 | Ahrens ......................... | 74/331 |
| 7,066,043 B2 | * | 6/2006 | Kim et al. .................... | 74/330 |
| 2005/0193848 A1 | * | 9/2005 | Gitt .............................. | 74/340 |
| 2005/0241424 A1 | * | 11/2005 | Baldascini et al. ........... | 74/331 |
| 2006/0201269 A1 | * | 9/2006 | Maillard et al. .............. | 74/340 |

FOREIGN PATENT DOCUMENTS

| | | |
|---|---|---|
| DE | 10054318 | 5/2002 |
| DE | 10153014 | 5/2003 |
| DE | 10305241 | 9/2004 |
| EP | 1077336 A1 | 7/1999 |
| EP | 1124079 | 8/2001 |
| JP | 2003-301895 | 10/2003 |

* cited by examiner

*Primary Examiner*—Sherry Estremsky
(74) *Attorney, Agent, or Firm*—Morgan Lewis & Bockius LLP

(57) ABSTRACT

In a double clutch transmission, the number of components of the transmission may be reduced and the gear train optimally arranged with a plurality of gears for two clutches and six-stage gear ratios. Such an arrangement proves for smooth shifting of gears to the range R and compacting of the structure of the transmission to facilitate positioning and assembly of the transmission in the vehicle.

12 Claims, 2 Drawing Sheets

DOUBLE CLUTCH TRANSMISSION

CROSS-REFERENCE TO RELATED APPLICATIONS

The present application is based on, and claims priority from, Korean Application Serial Number 10-2004-0063803, filed on Aug. 13, 2004, the disclosure of which is hereby incorporated by reference herein in its entirety.

FIELD OF THE INVENTION

The present invention relates to a double clutch transmission adapted to reduce the number of components required in the transmission and to optimally arrange the gear train, thereby improving the loading of the transmission in the vehicle.

BACKGROUND OF THE INVENTION

A double clutch transmission selectively receives engine power through two clutches, enabling to embody an automatized transmission without a driver's manual manipulation of the gear shift.

The double clutch transmission typically has at least six-stage gear ratios; however, a plurality of gears for two clutches and six-stage gear ratios causes the size of the transmission to increase, thus making the transmission difficult to be mounted in the vehicle.

SUMMARY OF THE INVENTION

Embodiments of the present invention are provided to decrease the number of utilized components in the transmission and to optimize the arrangement of the gear train with a plurality of gears for two clutches and six-stage gear ratios, thereby compacting the structure of a double clutch transmission and consequently improving the loading of the transmission in the vehicle.

A double clutch transmission according to one embodiment includes a first input shaft directly connected to a first clutch. A second input shaft is directly connected to a second clutch and has a rotation shaft identical to that of the first input shaft. A first speed drive gear, third speed drive gear and fifth speed drive gear are installed at the first input shaft. A second speed drive gear and fourth-sixth speed drive gear are installed at the second input shaft. A first output shaft is installed with a first output gear and a plurality of speed driven gears that meshes with the speed drive gears of the first input shaft and second input shaft. A second output shaft is installed with a second output gear and a plurality of speed driven gears that meshes with the speed drive gears of the first input shaft and second input shaft. A differential includes a ring gear engaged with the first output gear and second output gear.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
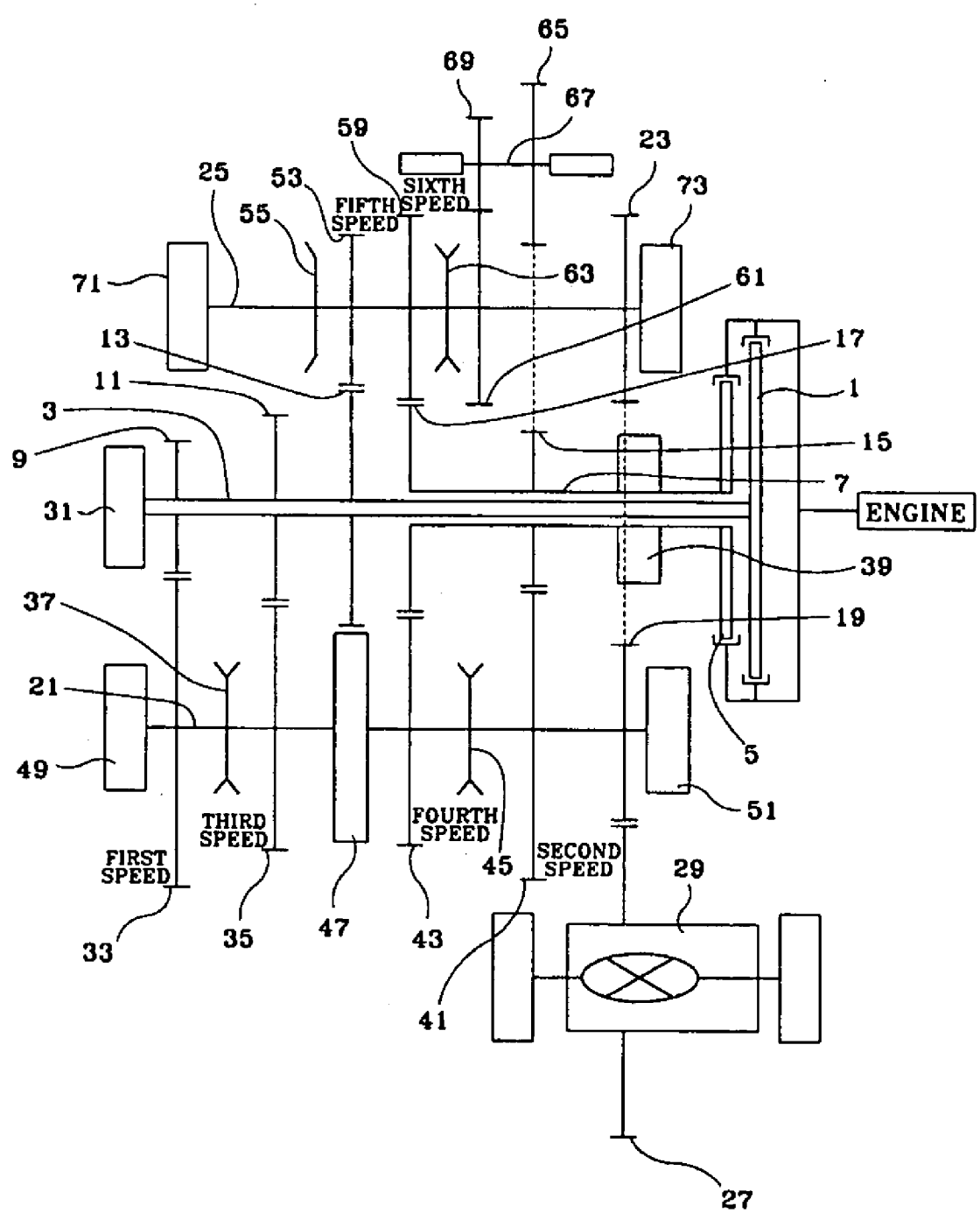
FIG. 1 is a schematic view of the structure of a double clutch transmission according to an embodiment of the present invention.
Figure 2:
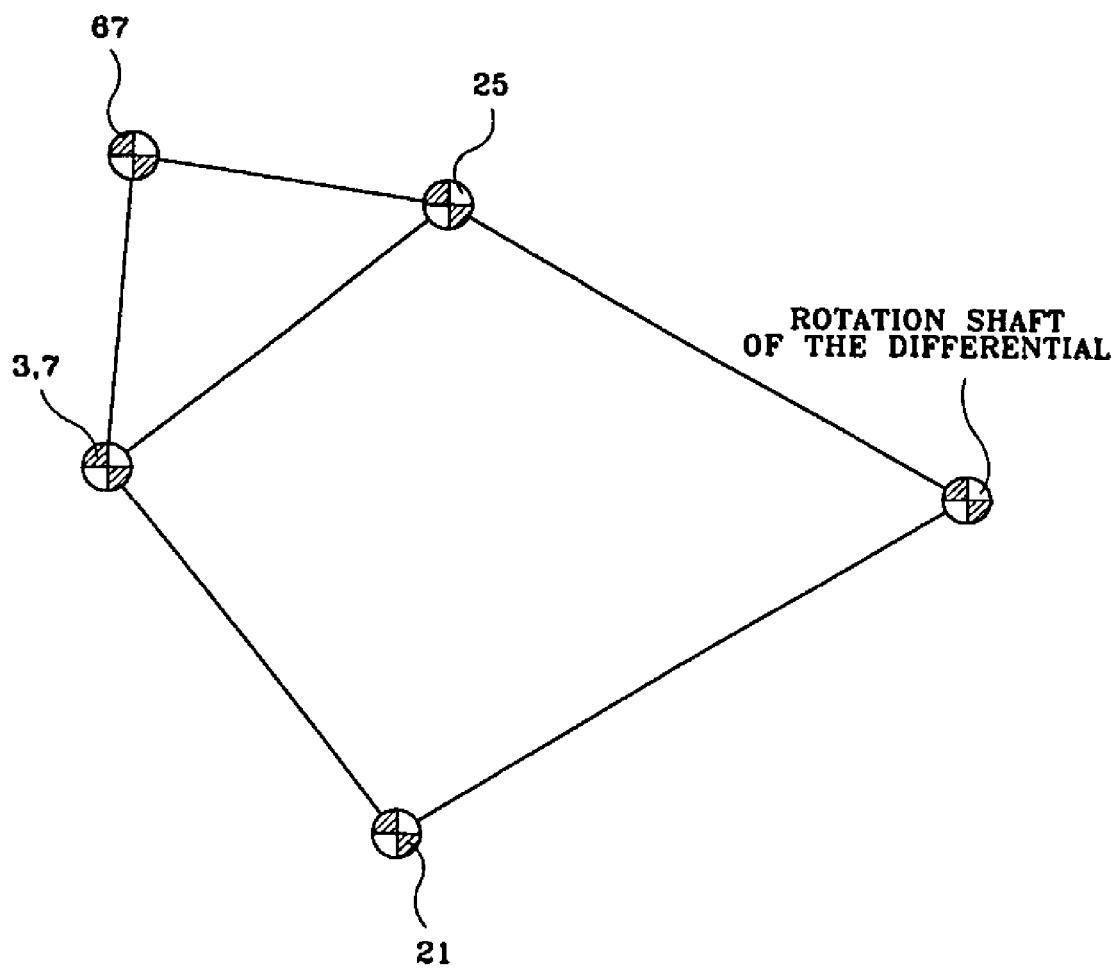
FIG. 2 is an arrangement plan of shafts when observed from the left of FIG. 1.

Referring to FIG. 1, a first input shaft 3 according to an embodiment of the present invention is directly connected to a first clutch 1. A second input shaft 7 is directly connected to a second clutch 5 and has a rotation shaft identical to that of first input shaft 3. A first speed drive gear 9, third speed drive gear 11, and fifth speed drive gear 13 are installed at first input shaft 3. A second speed drive gear 15 and fourth-sixth speed drive gear 17 are installed at second input shaft 7. A first output shaft 21 is installed with a first output gear 19 and a plurality of speed driven gears, which meshes with the speed drive gears of first input shaft 3 and second input shaft 7. A second output shaft 25 is installed with a second output gear 23 and a plurality of speed driven gears, which meshes with the speed drive gears of first input shaft 3 and second input shaft 7. A differential 29 has a ring gear 27 engaged with first output gear 19 and second output gear 23.

First input shaft 3 and second input shaft 7 receive the power of the engine via first clutch 1 and second clutch 5. Second input shaft 7 encloses the circumference of first input shaft 3 as illustrated in the drawing.

Hereinafter, for the purposes of clarity of description only, the left of FIG. 1 designates the rear of the transmission and the right thereof designates the front of the transmission.

The rear end of first input shaft 3 is supported by a first input shaft main bearing 31. First speed drive gear 9 is disposed on first input shaft 3 and closely located to first input shaft main bearing 31. Third speed drive gear 11 is installed on first input shaft 3 in front of first speed drive gear 9. Fifth speed drive gear 13 is also positioned on first input shaft 3 in front of third speed drive gear 11.

First input shaft 3 is installed in order with the first, third, and fifth speed drive gears from the rear toward the front of the vehicle. First input shaft main bearing 31 is located near first speed drive gear 9 to properly support a high load of first speed drive gear 9.

Corresponding to the arrangement of the gears of first input shaft 3, first output shaft 21 is equipped with a first speed driven gear 33, third speed driven gear 35. First speed driven gear 33 engages with first speed drive gear 9, and third speed driven gear 35 engages with third speed drive gear 11. A first-third synchronizer 37 is interposed between first speed driven gear 33 and third speed driven gear 35.

When first-third synchronizer 37 operates, first output shaft 21 receives power from any one of first speed drive gear 9 or third speed drive gear 11 of first input shaft 3, and the power is transmitted to the wheels through differential 29. The first or third speed of the transmission can be embodied in the above state.

Second input shaft 7 is installed with fourth-sixth speed drive gear 17 in front of fifth speed drive gear 13. Second speed drive gear 15 is installed on second input shaft 7 in front of fourth-sixth speed drive gear 17. A second input shaft main bearing 39 is placed between second speed drive gear 15 and second clutch 5.

Second input shaft main bearing 39 is installed in close proximity to second speed drive gear 15, thus allowing a high load of second speed drive gear 15 to be properly supported.

First output shaft 21 is installed with a second speed driven gear 41, fourth speed driven gear 43, and second-fourth synchronizer 45. Second speed driven gear 41 engages with second speed drive gear 15, and fourth speed driven gear 43 engages with fourth-sixth speed drive gear 17. Second-fourth synchronizer 45 is interposed between second speed driven gear 41 and fourth speed driven gear 43.

When second-fourth synchronizer 45 operates, first output shaft 21 receives power from any one of second speed drive gear 15 or fourth-sixth speed drive gear 17 of second input shaft 7, and the power is transmitted to the wheels through differential 29. The second or fourth speed of the transmission can be embodied in the above state.

A parking gear 47 is equipped between third speed driven gear 35 and fourth speed driven gear 43 of first output shaft 21. A spacer may be located at the position of parking gear 47. However, in one embodiment of the present invention, parking gear 47 functions as the spacer, which retains the interval of third speed driven gear 35 and fourth speed driven gear 43, thereby reducing the number of components and weight of the transmission.

The rear end of first output shaft 21 is supported by a first output shaft rear main bearing 49. First output gear 19 is equipped in front of second speed driven gear 41, and a first output shaft front main bearing 51 that supports first output shaft 21 is equipped in front of first output gear 19.

Thus, the high load applied on first speed driven gear 33 is properly supported via first output shaft rear main bearing 49 adjacently located to first speed driven gear 33. The high load on second speed driven gear 41 is properly supported via first output shaft front main bearing 51 adjacently located to second speed driven gear 41.

Second output shaft 25 is equipped with a fifth speed driven gear 53 and fifth synchronizer 55. Fifth speed driven gear 53 engages with fifth speed drive gear 13, and fifth synchronizer 55 converts the power transmission state between fifth speed driven gear 53 and second output shaft 25.

The fifth speed state can be performed by manipulating fifth synchronizer 55 to operate differential 29 by sequentially transmitting power from first input shaft 3 to fifth speed drive gear 13, fifth speed driven gear 53, second output shaft 25 and second output gear 23.

Second output shaft 25 is equipped with a sixth speed driven gear 59 that engages with fourth-sixth speed drive gear 17. A reverse (R) driven gear 61 is also installed on second output shaft 25. A sixth-R synchronizer 63 is positioned between sixth speed driven gear 59 and reverse driven gear 61.

A reverse idle driven gear 65 meshes with second speed drive gear 15 and is installed on a reverse idle shaft 67. A reverse idle drive gear 69 is installed on reverse idle shaft 67 and meshes with reverse driven gear 61.

During the operation of sixth-R synchronizer 63, the sixth speed or reverse state can be performed. If the transmission is in the sixth speed state, the power from second input shaft 7 is sequentially transmitted to differential 29 through fourth-sixth speed drive gear 17, sixth speed driven gear 59, second output shaft 25, and second output gear 23.

In case of the reverse state, the power from second input shaft 7 is transmitted to differential 29 successively through second speed drive gear 15, reverse idle driven gear 65, reverse idle shaft 67, reverse idle drive gear 69, reverse driven gear 61, second output shaft 25, and second output gear 23.

The rotation of reverse driven gear 61 is in a reverse direction to that of second speed drive gear 15 via reverse idle driven gear 65, reverse idle shaft 67 and reverse idle drive gear 69, thus allowing the rear shift to be performed.

Reverse idle driven gear 65 operates via second speed drive gear 15 in the embodiment of the present invention without a supplementary gear, thus decreasing the number of components and weight of the transmission.

The interval between reverse idle driven gear 65 and reverse idle drive gear 69 is smaller than that between second speed drive gear 15 and fourth-sixth speed drive gear 17.

The reverse idle shaft 67 mounted with reverse idle driven gear 65 and reverse idle drive gear 69 can be formed with a short length, resulting in a reduction of the transmission weight. Further, during the shift to the range R, a smooth gearshift can be executed by reducing the inertia of reverse idle shaft 67.

Second output shaft 25 is mounted with fifth synchronizer 55 at the rear of fifth speed driven gear 53. A second output shaft rear main bearing 71 supporting second output shaft 25 is mounted at the rear of fifth synchronizer 55. Second output gear 23 is installed in front of reverse driven gear 61. A second output shaft front main bearing 73 is placed in front of second output gear 23. This allows second output shaft 25 to firmly be supported at the transmission case.

As apparent from the foregoing, there is an advantage in that although a plurality of gears for two clutches and six-stage gear ratios are included in the embodiment of the present invention, the number of transmission components is reduced and the gear train is optimally arranged, contributing to a smooth gearshift to the range R and an improvement of the loading of the transmission in the vehicle by compacting the structure thereof.

What is claimed is:

1. A double clutch transmission, comprising:
   a first input shaft directly connected to a first clutch;
   a second input shaft directly connected to a second clutch and having an axis of rotation identical to that of said first input shaft;
   a first speed drive gear, third speed drive gear and fifth speed drive gear installed at said first input shaft;
   a second speed drive gear and fourth-sixth speed drive gear installed at said second input shaft;
   a first output shaft installed with a first output gear and a plurality of speed driven gears that meshes with said speed drive gears of said first input shaft and second input shaft;
   a second output shaft installed with a second output gear and a plurality of speed driven gears that meshes with said speed drive gears of said first input shaft and second input shaft; and
   a differential with a ring gear engaged with said first output gear and second output gear;
   wherein said second input shaft is installed with said fourth-sixth speed drive gear in front of said fifth speed drive gear, said second speed drive gear installed in front of said fourth-sixth speed drive gear, and a second input shaft main bearing placed between said second speed drive gear and second clutch;
   wherein said first input shaft is supported at a rear end thereof via a first input shaft main bearing, said first speed drive gear closely located to said first input shaft main bearing at said first input shaft, said third speed drive gear installed in front of said first speed drive gear, and said fifth speed drive gear positioned in front of said third speed drive gear.

2. The transmission as defined in claim 1, further comprising:
   a first speed driven gear installed at said first output shaft and engaging with said first speed drive gear;
   a third speed driven gear installed at said first output shaft and engaging with said third speed drive gear; and a first-third synchronizer installed between said first speed driven gear and third speed driven gear.

3. The transmission as defined in claim 2, wherein a rear end of said first output shaft is supported via a first output shaft rear main bearing.

4. The transmission as defined in claim 1, further comprising:
- a second speed driven gear installed at said first output shaft and engaging with said second speed drive gear;
- a fourth speed driven gear installed at said first output shaft and engaging with said fourth-sixth speed drive gear; and
- a second-fourth synchronizer installed between said second speed driven gear and fourth speed driven gear.

5. The transmission as defined in claim 4, further comprising:
- a parking gear equipped between said third speed driven gear and fourth speed driven gear of said first output shaft.

6. The transmission as defined in claim 4, wherein said first output gear is installed in front of said second speed driven gear, and a first output shaft front main bearing for supporting said first output shaft installed in front of said first output gear.

7. The transmission as defined in claim 1, further comprising:
- a fifth speed driven gear installed at said second output shaft and engaging with said fifth speed drive gear; and
- a fifth synchronizer that is mounted at said second output shaft and converts a power transmission state between said fifth speed driven gear and second output shaft.

8. The transmission as defined in claim 7, further comprising:
- a sixth speed driven gear installed at said second output shaft and engaging with said fourth-sixth speed drive gear;
- a reverse driven gear installed at said second output shaft; and
- a sixth-R synchronizer positioned between said sixth speed driven gear and reverse driven gear.

9. The transmission as defined in claim 8, further comprising:
- a reverse idle driven gear that meshes with said second speed drive gear;
- a reverse idle shaft installed with said reverse idle driven gear; and
- a reverse idle drive gear installed at said reverse idle shaft and meshed with said reverse driven gear.

10. The transmission as defined in claim 8, wherein an interval between said reverse idle driven gear and reverse idle drive gear is smaller than an interval between said second speed drive gear and fourth-sixth speed drive gear.

11. The transmission as defined in claim 8, wherein said fifth synchronizer is installed at said second output shaft at a rear of said fifth speed driven gear, a second output shaft rear main bearing mounted at a rear of said fifth synchronizer for supporting said second output shaft, said second output gear installed in front of said reverse driven gear, and a second output shaft front main bearing placed in front of said second output gear.

12. The transmission as defined in claim 1, further comprising:
- a first speed driven gear installed at said first output shaft and engaging with said first speed drive gear;
- a third speed driven gear installed at said first output shaft and engaging with said third speed drive gear; and
- a first-third synchronizer installed between said first speed driven gear and third speed driven gear.

* * * * *